(12) United States Patent
Cooper et al.

(10) Patent No.: US 7,026,990 B2
(45) Date of Patent: Apr. 11, 2006

(54) INTERFEROMETER ARRANGEMENT FOR UNAMBIGUOUS DETERMINATION OF AN ANGLE OF INCIDENCE OF INCIDENT ELECTROMAGNETIC RADIATION

(75) Inventors: Robert David Cooper, Hatfield (GB); Alexis Mark Cooper, Hatfield (GB)

(73) Assignee: Bae Systems, PLC, London (GB)

( * ) Notice: Subject to any disclaimer, the term of this patent is extended or adjusted under 35 U.S.C. 154(b) by 0 days.

(21) Appl. No.: 10/852,048

(22) Filed: May 24, 2004

(65) Prior Publication Data

US 2005/0052316 A1    Mar. 10, 2005

Related U.S. Application Data

(63) Continuation of application No. PCT/GB04/01500, filed on Apr. 6, 2004.

(30) Foreign Application Priority Data

Apr. 10, 2003   (EP) .................................. 03252273
Apr. 10, 2003   (GB) .................................. 0308265

(51) Int. Cl.
  *G01S 13/00*    (2006.01)
(52) U.S. Cl. ..................... 342/424; 342/156; 342/442
(58) Field of Classification Search ............... 342/424, 342/156, 442
  See application file for complete search history.

(56) References Cited

U.S. PATENT DOCUMENTS

| 4,975,710 A | 12/1990 | Baghdady |
| 5,892,700 A | 4/1999 | Haardt |
| 6,313,794 B1 | 11/2001 | Rose |
| 6,377,214 B1 * | 4/2002 | Melville et al. ............ 342/442 |

FOREIGN PATENT DOCUMENTS

| EP | 0 693 693 A1 | 1/1996 |
| EP | 1 026 777 A2 | 8/2000 |
| EP | 1184675 A2 | 3/2002 |
| GB | 1 191 831 | 5/1970 |
| GB | 1 401 273 | 6/1972 |
| GB | 1 286 105 | 8/1972 |
| GB | 1 296 296 | 11/1972 |
| GB | 1 305 480 | 1/1973 |
| GB | 1 337 099 | 11/1973 |
| GB | 1 540 418 | 2/1979 |
| GB | 2 147 760 A | 5/1985 |

OTHER PUBLICATIONS

Malloy, Analysis and Synthesis Of General Planar Interferometer Arrays, XP 000606792, CH-6/83/0000-0352, 1983 IEEE, ICASSP 83, Boston, pp. 352-355.

Haardt et al., 3-D Unitary ESPRIT for Joint 2-D Angle And Carrier Estimation, 0-8186-7919-0/97, 1997 IEEE, pp. 255-258.

* cited by examiner

*Primary Examiner*—Thomas H. Tarcza
*Assistant Examiner*—F H Mull
(74) *Attorney, Agent, or Firm*—Buchanan Ingersoll PC

(57) ABSTRACT

An interferometer arrangement includes an antenna array that receives radiation from a plane wave emitted by a transmitter, the radiation being incident on the array at an angle ($\theta$). The array includes a plurality of antennas that provide output signals to a switching unit. The switching unit selects pairs of signals and passes them to a processor for processing. The processor is configured to produce an output signal that unambiguously indicates the value of the angle ($\theta$).

11 Claims, 9 Drawing Sheets

INTERFEROMETER ARRANGEMENT FOR UNAMBIGUOUS DETERMINATION OF AN ANGLE OF INCIDENCE OF INCIDENT ELECTROMAGNETIC RADIATION

RELATED APPLICATIONS

This application is a continuation of International Application No. PCT/GB2004/001500, filed on Apr. 6, 2004, the entire disclosure of which is incorporated by reference.

BACKGROUND

The present invention relates to interferometers and is more particularly concerned with the measurement of angle of incidence of electromagnetic radiation incident on such an interferometer.

It is known to use a pair of antennas to detect the location of an electromagnetic signal. The pair of antennas is arranged such that the spacing between the two antennas is such that the phase difference, $\phi$, of the signals arriving at the antennas can be calculated using Bragg's law:

$$\phi = \frac{2\pi d \sin\theta}{\lambda}$$

where $\theta$ is the angle at which the signals approach the two antennas, d is the spacing between the antennas and $\lambda$ is the wavelength of the incident radiation.

The phase difference of the incident electromagnetic signal at the two antennas can be measured and the location of the electromagnetic signal can then be determined from the angle at which the signals approach the two antennas using Bragg's law.

However, the phase difference between the signals arriving at two antennas can only be measured modulo $2\pi$. This means that for a phase difference of $\phi$ there may be more than one value that will satisfy Bragg's law thereby producing an ambiguous result. In order to overcome this problem, it is necessary to locate the pair of antennas sufficiently close so that no matter what angle, $\theta$, at which the incident radiation arrives at the antennas, the phase difference would never exceed $2\pi$. In order to do this, the phase difference, $\phi$, must be kept in the interval $[-\pi, \pi)$, such that:

$$\pi > \left| \frac{2\pi d \sin\theta}{\lambda} \right|.$$

For incident radiation having a frequency of less than 18 GHz and an antenna specification where $\theta$ is limited such that $|\theta|<60°$, then $d=d_o$ is 9.2 mm as a suitable separation between the two antennas.

However, while this is possible in theory, it is practically impossible for the antennas to be less than a few centimeters apart. This leads to ambiguity as to how many $2\pi$ are needed to add to the measured phase to get the correct measurement.

It is therefore an object of the present invention to provide an interferometer arrangement which overcomes the problems mentioned above and provides unambiguous determinations of the angle of incidence of incident electromagnetic radiation.

SUMMARY

In accordance with one aspect of the present invention, there is provided an interferometer arrangement comprising at least three antennas arranged to receive a plane wave of electromagnetic radiation from a transmitter, each antenna being spaced from one another in at least two orthogonal dimensions of a plane such that the spacing in each dimension between pairs of antennas are integral multiples of the unit spacing determined by the frequency of the electromagnetic radiation and the characteristics of the antennas.

The antennas may be arranged in a plane in a planar antenna array. In this case, the vector spacing $k_i$ between pairs of antennas, where $i=1, 2, \ldots, m$, is such that by application of two matrices $Q_x$ and $Q_y$ with integer entries, it can be resolved into two orthogonal linear arrays which each have spacing vectors $k_x$ and $k_y$ whose integer entries respectively have the highest common factor of 1.

The unit spacing in each of the two dimensions may be different to provide different angular sensitivity.

Alternatively, the antennas may be arranged in three dimensions in a non-planar antenna array. In this case, the vector spacing $k_i$ between pairs of antennas, where $i=1, 2, \ldots, m$, is such that by application of three matrices $Q_x$, $Q_y$ and $Q_z$ with integer entries, it can be resolved into three orthogonal linear arrays which each have spacing vectors $k_x$, $k_y$ and $k_z$ whose integer entries respectively have the highest common factor of 1.

Advantageously, in three-dimensional arrangement, it is possible to measure both direction of arrival and frequency simultaneously.

In accordance with a second aspect of the present invention, there is provided a method of determining the location of a transmitter of electromagnetic radiation using an interferometer arrangement according to any one of the preceding claims, the method comprising the steps of: receiving radiation from the transmitter; selecting signals from a number of pairs of antennas in the interferometer arrangement for processing; and processing the selected signals from the selected pairs of antennas to determine unambiguously the location of the transmitter. Preferably, the signals are selected from at least three pairs of antennas.

BRIEF DESCRIPTION OF DRAWINGS

For a better understanding of the present invention, reference will now be made, by way of example only, to the accompanying drawings in which.

DETAILED DESCRIPTION

Figure 1:
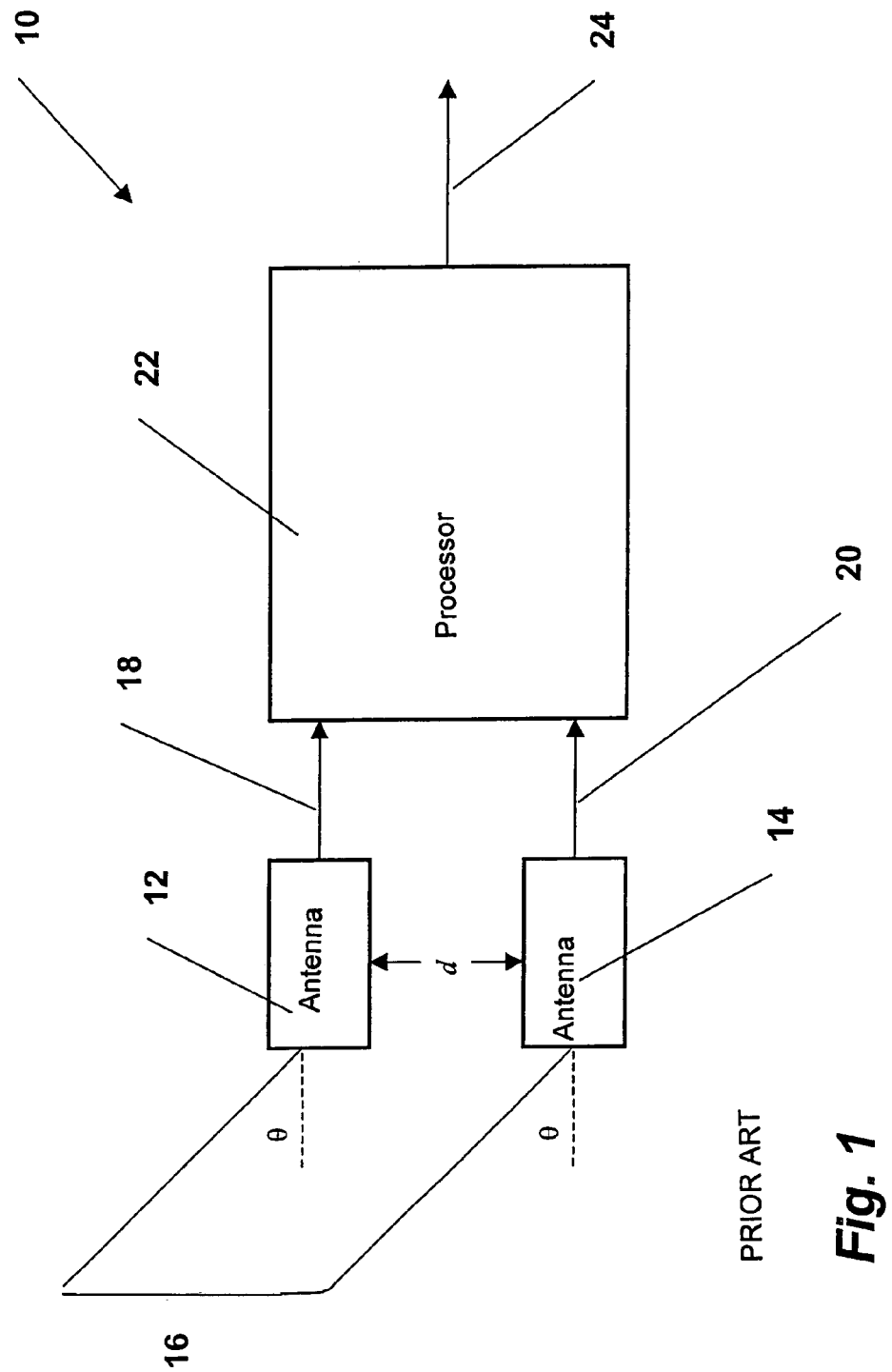
FIG. 1 is a schematic block diagram of conventional apparatus for determining the location of a radar or other incident electromagnetic radiation.

Referring initially to FIG. 1, a conventional interferometer arrangement 10 is shown in which two antennas 12, 14 are spaced apart a distance, d. Each antenna 12, 14 is arranged to receive a plane wave 16 of electromagnetic radiation being emitted from a transmitter (not shown) located at an unknown angle, θ. Each antenna 12, 14 is selected to receive radiation from the plane wave 16 at a particular frequency and hence wavelength, λ.

Each antenna 12, 14, when it receives radiation from the plane wave 16, produces an output signal 18, 20 which is passed to a processor 22 for processing. Processor 22 determines the unknown angle, θ, of the transmitter using Bragg's law:

$$\phi = \frac{2\pi d \sin\theta}{\lambda}$$

as the phase difference, φ, between the radiation arriving at each antenna 12, 14 can also be measured or determined. However, as mentioned above, the phase difference between the signals arriving at each antenna 12, 14 can only be measured to modulo 2π, and ambiguity may exist in the determined value of θ.

If χ is the phase difference which is actually measured between the two antennas, then the errors can be expressed as follows:

$$\chi = \alpha d + \varepsilon + \Delta$$

where:

$$\alpha = \frac{2\pi \sin\theta}{\lambda}, \varepsilon \sim N(0, \sigma^2)$$

and Δ is the deterministic error and ε is a random variable which is distributed with a normal distribution having a mean of 0 and a variance of $\sigma^2$. For ease of explanation, Δ will be ignored in the following example, but it will be readily appreciated that Δ can be allowed for in any practical system in accordance with known processing techniques.

Deterministic errors refer to the phase measurement errors which have a non-zero mean between RF antenna channels and occurs where two channels of a M-channel RF switch is used with a systematic path difference in the switch. The present invention allows for sequential measurement of the antenna pair phase difference (two channel receiver) or simultaneous measurement of phase at each antenna (N-channel receiver) and the subtraction of the phases to form the phase differences. The choice of measurement scheme is reflected in the measurement covariance matrix R which is diagonal for the first case and non-diagonal for the second case.

Non-deterministic errors refer to the phase measurement errors which have a zero mean between RF antenna channels. These errors would occur where the RF channels behind the antennas are perfectly matched, for example, matched cables and no path differences introduced by RF switches.

Figure 2:
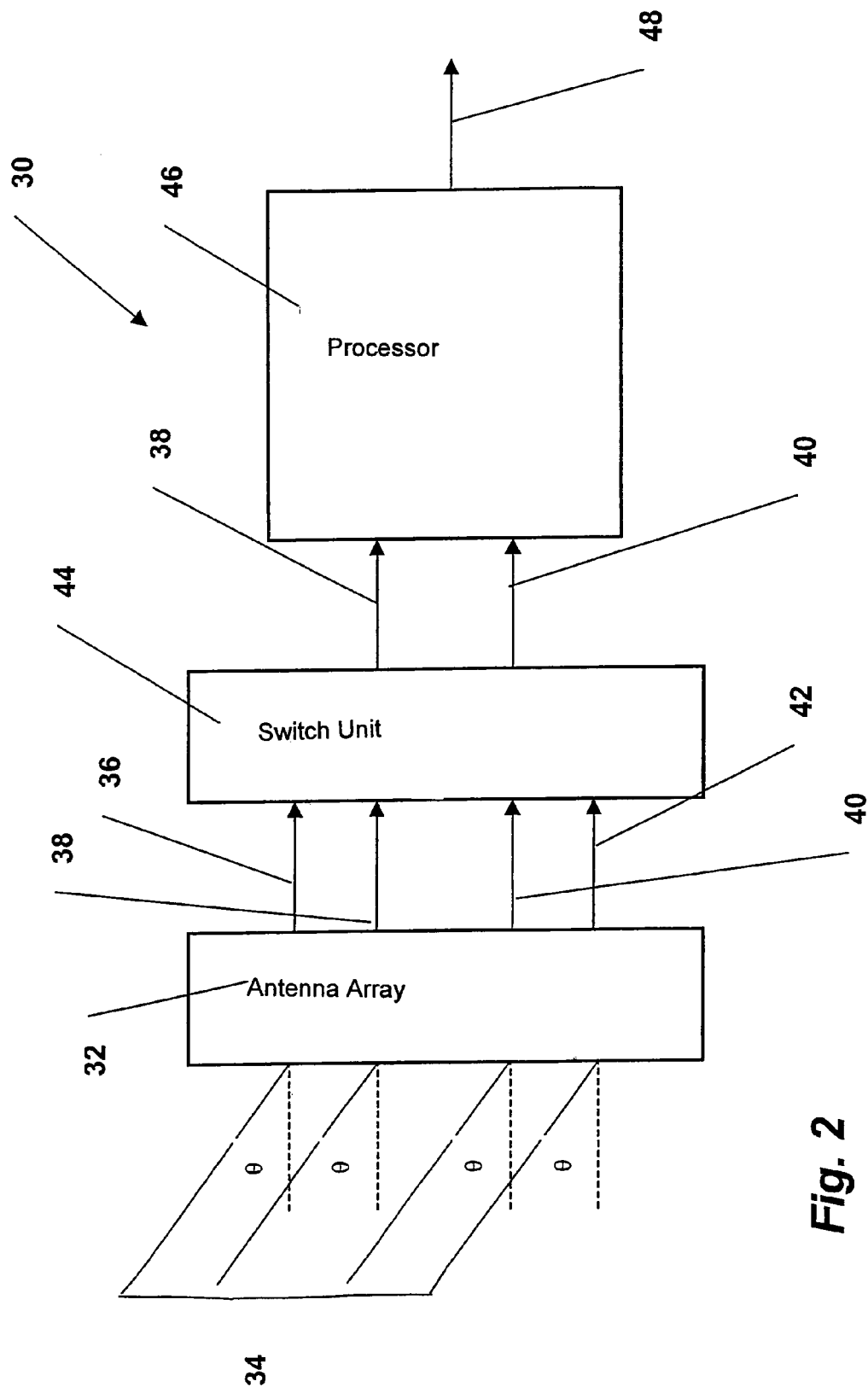
FIG. 2 is a schematic block diagram of apparatus for determining the location of a transmitter of electromagnetic radiation in accordance with the present invention.

In accordance with the present invention, an improved interferometer arrangement 30 is shown in FIG. 2. The interferometer arrangement 30 comprises an antenna array 32 which receives a plane wave 34 of electromagnetic radiation from a transmitter (not shown) located at an unknown angle, θ, as before. The antenna array 32 comprises a plurality of antennas which receive the radiation of the plane wave 34. In this particular example, there are four antennas (not shown individually). Each antenna provides an output signal 36, 38, 40, 42 to a switching unit 44 which selects two of the output signals, say 38, 40, to pass to processor 46 for processing. Here, four pairs of signals from different antenna pairs are selected and passed to the processor for processing. Processor 46 processes the four pairs of signals and provides an output signal 48 which gives the value of θ.

Alternatively, if a digital receiver is used to receive the signals, switching unit 44 is not needed. This is because the signals received by the digital receiver can be combined in any way necessary to provide θ.

Figure 3:
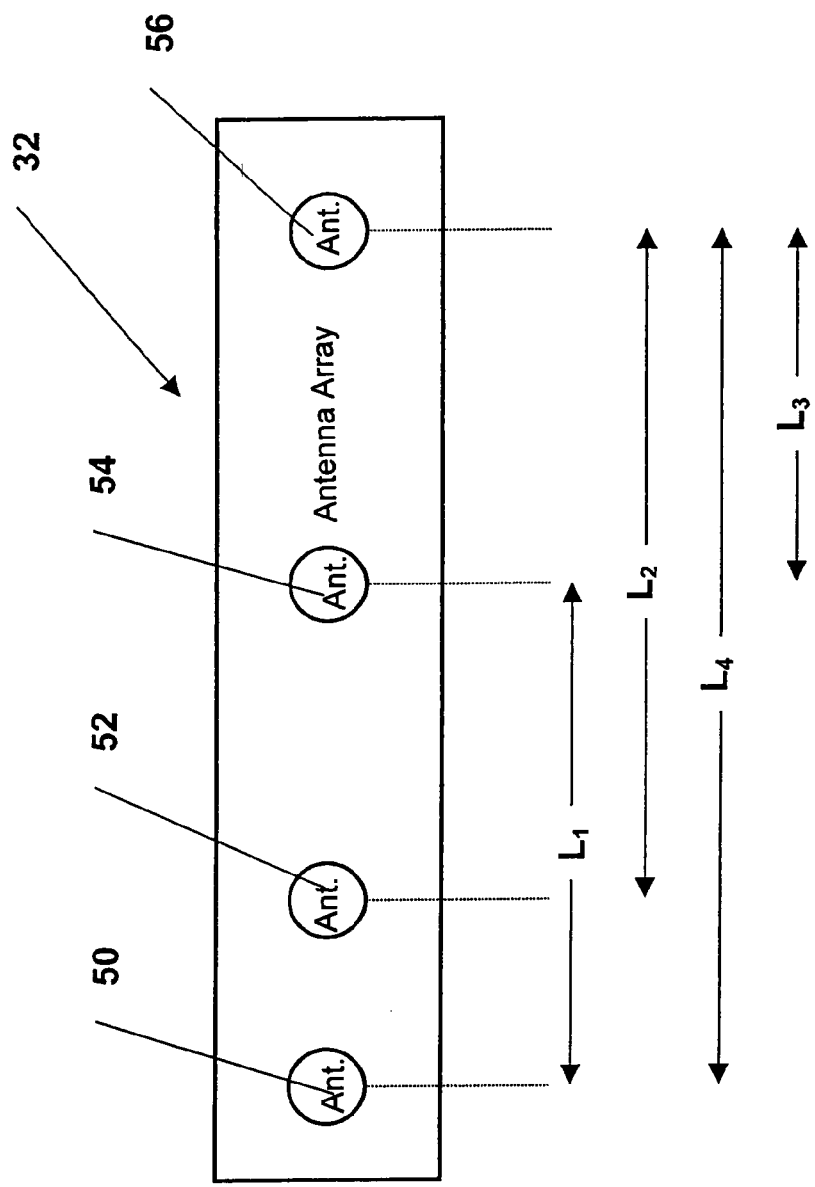
FIG. 3 illustrates one embodiment of an antenna array for use in the apparatus of FIG. 2.

FIG. 3 illustrates one embodiment of an antenna array 32 in more detail. The array 32 includes four antennas 50, 52, 54, 56 arranged in a straight line. Each antenna 50, 52, 54, 56 may comprise a spiral antenna as described in EP-A-1 026 777. Alternatively, any other suitable antenna can be used.

Each antenna 50, 52, 54, 56 is spaced from its adjacent antennas such that the spacing between antenna 50 and antenna 54 is $L_1$, the spacing between antenna 52 and antenna 56 is $L_2$, the spacing between antenna 54 and antenna 56 is $L_3$, and the spacing between antenna 50 and antenna 56 is $L_4$. The choice of pairings is by way of example in this particular embodiment.

As discussed above, for radiation frequencies of less than 18 GHz, the value of the spacing, $d_0$, between a pair of antennas which allows the phase to be unambiguously identified is 9.2 mm. In accordance with the present invention, $L_1$, $L_2$, $L_3$ and $L_4$ are chosen to be integral multiples of $d_0$, that is:

$L_1 = k_1 d_0$ p1 $L_2 = k_2 d_0$ $L_3 = k_3 d_0$ $L_4 = k_4 d_0$ where $k_1$, $k_2$, $k_3$, $k_4$ are relatively prime. This means that the values of $k_1$, $k_2$, $k_3$, $k_4$ have a highest common factor such that $hcf(k_1, k_2, k_3, k_4) = 1$.

By combining measurements of phase difference between various pairs of antennas in antenna array 32, a good estimate of the phase difference that would be measured between two antennas that had a separation distance $d_0$ can be obtained. This unambiguously gives the angle of arrival, θ.

However, it is to be noted that when choosing the values of $k_1$, $k_2$, $k_3$, $k_4$ the values must be physically realizable. One way of determining if the values of $k_1$, $k_2$, $k_3$, $k_4$ are physically realistic is by running through all possible values for $k_1$, $k_2$, $k_3$, $k_4$ for each possible way of separating four antennas, and for each way, examining the different values of $k_1$, $k_2$, $k_3$, $k_4$ produced by picking different sets of pairs of antennas.

Figure 4:
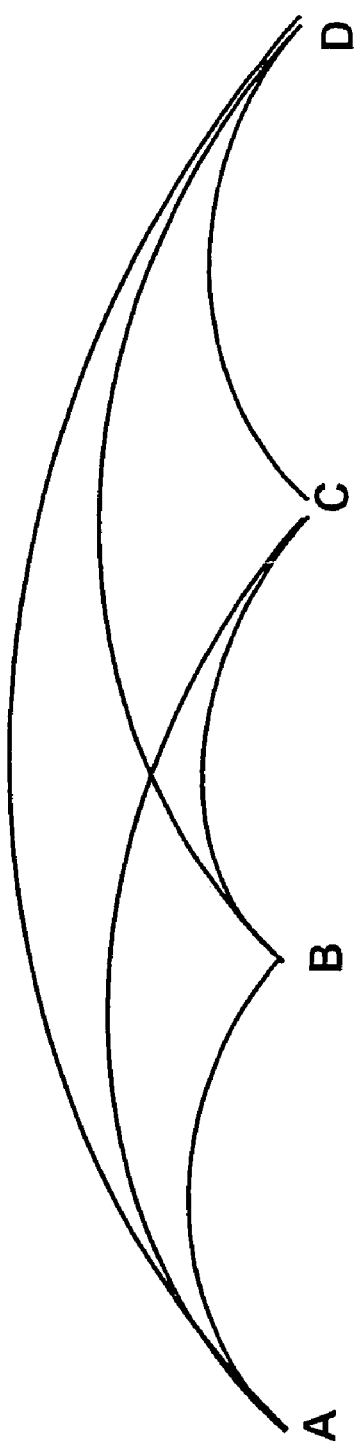
FIG. 4 illustrates the number of pairings from four antennas.
Figure 5:
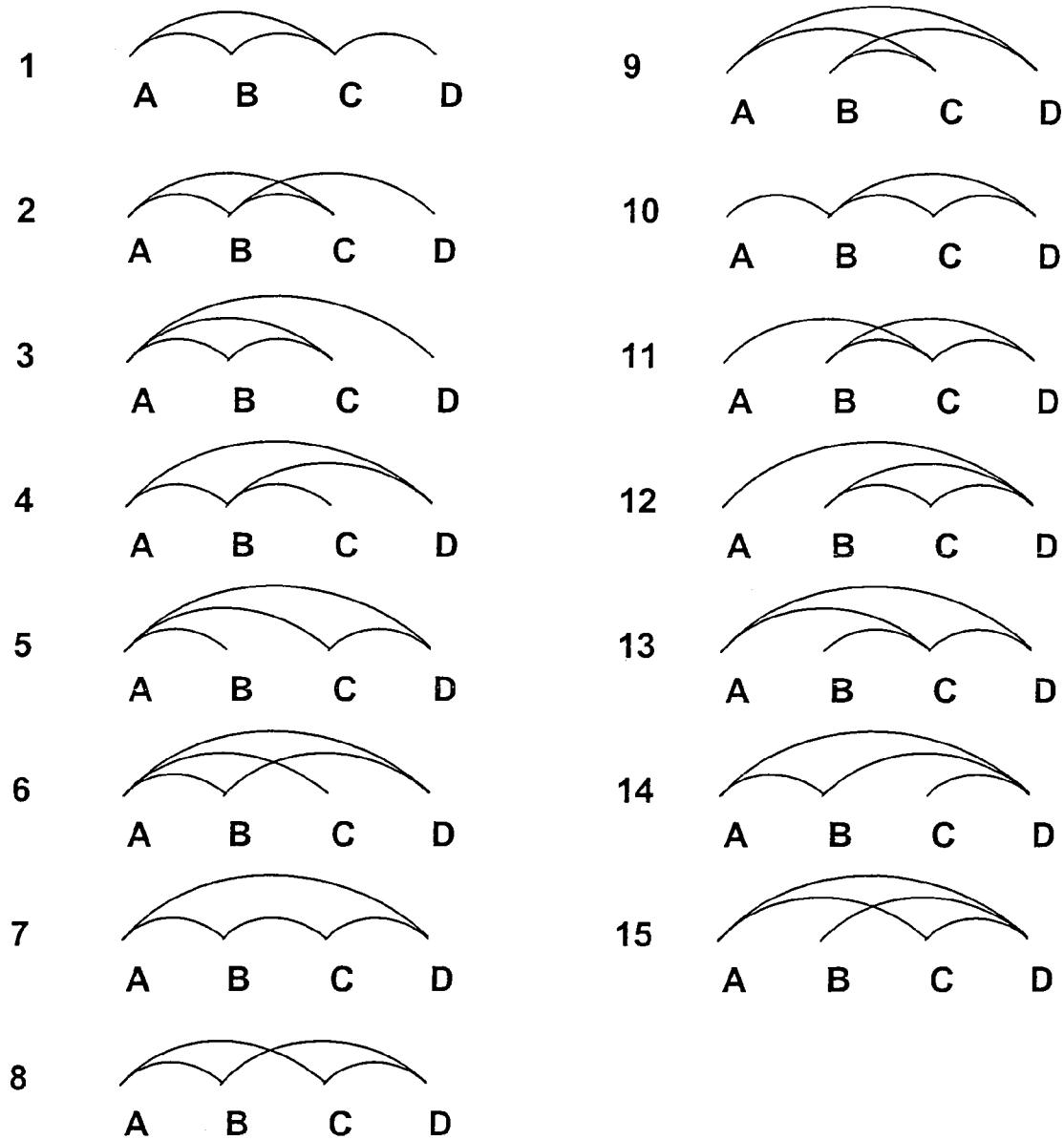
FIG. 5 illustrates the possible combinations for selecting four pairings for four antennas.

For example, for the example shown in FIG. 3, four pairs of antennas must be picked from the six possible choices as shown in FIG. 4. This gives 15 different ways of choosing four pairs of antennas as shown in FIG. 5. Of the 15 different choices shown, choices 1 to 6 can be considered as being mirror images of choices 10 to 15 and therefore the choices can be limited to choices 1 to 9.

When an antenna array 32 as described with reference to FIG. 3 is utilized in the interferometer arrangement 30, a plurality of virtual interferometers is formed. In order to describe how this works in more detail, a simpler antenna array having three antennas is illustrated in FIG. 6.

Figure 6:
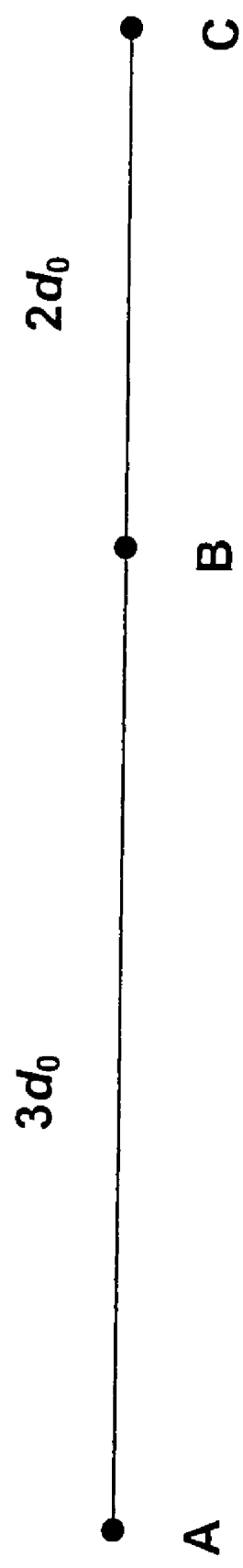
FIG. 6 illustrates a simplified embodiment of an antenna array in accordance with the present invention.

In FIG. 6, a line of three antennas A, B, C is shown. Each pair of antennas A-B, B-C, A-C has an integer multiple of d0 between them as shown, namely, 3 $d_0$ between A-B, 2 $d_0$ between B-C and 5 $d_0$ between A-C. In this example, three virtual interferometers can be constructed and M=3. In general, if there are several antennas in a line, it is necessary to identify M pairs of antennas and make M phase difference measurements between these pairs. The same antennas may be used in more than one pair, but note that if the measurements are to be independent, it may be necessary to do one measurement a split second after another.

In the example shown in FIG. 6, $k=(5, 2, 3)^T$ if the signals are processed from antenna pairs in the order A-C, B-C and A-B.

In order to determine the positions of the antennas in a particular space, it is necessary to determine the maximum size allowed for the antenna array in the x and P directions. The antenna coordinates are integral numbers of the separate unit distances in the x and y directions respectively. The choice of unit distances determines the frequency and unambiguous angle range in horizontal and vertical elevations.

The next step is to determine the number of antennas to be used and the number of antenna pairs which are to be used to measure phase differences. It is not required to have a common reference antenna. A set of possible antenna meta x-coordinate spacings $\{K'_x\}$ is constructed. The term 'spacing' means the distance between antenna pairs selected to make a measurement. These are not the physical antenna x-coordinates but just a stage in the determination. The spacings have a highest common factor (HCF) of 1. Similarly, a set of all possible y-coordinate spacings $\{K_y\}$ is constructed for the y-dimension. All values for x and y are excluded if they fall outside the maximum size of the array.

A set of physical spacing matrices $\{K=[K_x K_y]\}$ is produced by iterating over all possible physical x- and y-antenna positions. From the set of possible K matrices and the set of possible meta x-coordinate spacings $\{K'_x\}$, combinations are chosen which have a mapping matrix $Q_x$ which satisfies the condition $Q_x K_x = K'_x$ and $Q_x K_y = 0$. A candidate set is recorded in accordance with the candidate geometries $(K, Q_x)$. The candidate set is edited to remove mirror-image candidate geometries.

A set of possible antenna meta y-coordinate spacings $\{K'_y\}$ are constructed. As before, these have HCF=1. From the candidate geometries $(K, Q_x)$ and the set of meta y-coordinate spacings $\{K'_y\}$, combinations are chosen which have a mapping matrix $Q_y$ which satisfies the condition $Q_y K_y = K'_y$ and $Q_y K_x = 0$. The candidate geometries $(K, Q_x, Q_y)$ are recorded in the candidate set.

For each geometry $(K, Q_x, Q_y)$ in the candidate set, two matrices $P_x$ and $P_y$ are found which satisfy $P_x K'_x = \xi$ and $P_y K'_y = \xi$ where $\xi$ is a column vector of all 1s. All entries without a solution are rejected and the candidate geometries $(K, Q_x, Q_y, P_x, P_y)$ are recorded in the candidate set.

For each candidate antenna configuration, statistical measurement accuracy is calculated and the best candidate antenna configurations are selected for constructing the base plate of the antenna design.

It is to be noted that the difference between a deterministic and non-deterministic design revolves around the calculation of the matrices $(K, Q_x, Q_y, P_x, P_y)$ with the condition that $P_x Q_x \xi = o$ and $P_y Q_y \xi = o$ where o is a column vector of zeros. The size of $Q_x$, $Q_y$, $P_x$ and $P_y$ is reduced by one column vector to accommodate this.

In order to construct N virtual interferometers, where $N \leq M$, a M×N matrix P is produced such that $P^T k = \xi$ where $$\xi = \begin{pmatrix} 1 \\ \ldots \\ 1 \end{pmatrix}$$

of length N and k is the matrix of the values of $k_1, \ldots, k_m$. If the vectors $p_1, \ldots p_N$ are the columns of P, then for $m=1, \ldots, N$, $P^T_m k = 1$.

For example, when N=3, $$P = \begin{pmatrix} -1 & 1 & 0 \\ 0 & -2 & 2 \\ 2 & 0 & -1 \end{pmatrix}, p_1 = \begin{pmatrix} -1 \\ 0 \\ 2 \end{pmatrix}, p_2 = \begin{pmatrix} 1 \\ -2 \\ 0 \end{pmatrix}, p_3 = \begin{pmatrix} 0 \\ 2 \\ -1 \end{pmatrix}.$$

Now if $$\chi = \begin{pmatrix} \chi_1 \\ \ldots \\ \chi_M \end{pmatrix} \text{ and } \varepsilon = \begin{pmatrix} \varepsilon_1 \\ \ldots \\ \varepsilon_M \end{pmatrix},$$

then $\chi = (\alpha d_0) k + \epsilon$ where $$\alpha = \frac{2\pi \sin \theta}{\lambda}.$$

If the phase difference, $\zeta_m$, associated with the m th virtual interferometer is defined as $\zeta_m = p_m^T \chi$ and $$\zeta = \begin{pmatrix} \zeta_1 \\ \ldots \\ \zeta_N \end{pmatrix},$$

then $\zeta = P^T \chi = \beta \xi + P^T \epsilon$ where $\beta = \alpha d_0$.

For example, $$\begin{pmatrix} \zeta_1 \\ \zeta_2 \\ \zeta_3 \end{pmatrix} = \begin{pmatrix} 2\chi_3 - \chi_1 \\ \chi_1 - 2\chi_2 \\ 2\chi_2 - \chi_3 \end{pmatrix} = \beta \begin{pmatrix} 1 \\ 1 \\ 1 \end{pmatrix} + \begin{pmatrix} 2\varepsilon_2 - \varepsilon_1 \\ \varepsilon_1 - 2\varepsilon_2 \\ 2\varepsilon_2 - \varepsilon_3 \end{pmatrix}.$$

Given measurements $\zeta_1, \ldots \zeta_N$, it is necessary to estimate $\beta$. It is possible to use the Maximum Likelihood Estimator (MLE), which is the value of $\beta$ which maximizes the joint density function given the measurements, that is, given $$\zeta = \begin{pmatrix} \zeta_1 \\ \ldots \\ \zeta_N \end{pmatrix},$$

maximize $$\frac{1}{((2\pi)^n |C|)^{\frac{1}{2}}} \exp\left(-\frac{1}{2} \delta^T C^{-1} \delta\right)$$

with respect to $\beta$ where $C = P^T R P$ and $\delta \sim N(0, C)$. This is achieved by minimizing $H = \delta^T C^{-1} \delta$.

If the estimate is $\hat{\beta}$, then since C is symmetric:

$$0 = \frac{\partial H}{\partial \beta}\bigg|_{\beta=\hat{\beta}}$$

$$= \frac{\partial}{\partial \beta}((\zeta - \beta\xi)^T C^{-1}(\zeta - \beta\xi))\bigg|_{\beta=\hat{\beta}}$$

$$= \xi^T C^{-1}(\zeta - \hat{\beta}\xi) - (\zeta - \beta\xi)^T C^{-1}\xi$$

$$= -2\xi^T C^{-1}(\zeta - \hat{\beta}\xi)$$

Hence $$\hat{\beta} = \frac{\xi^T C^{-1}\zeta}{\xi^T C^{-1}\xi} \text{ and } E(\zeta) = E(\beta\xi + P^T\varepsilon) = \beta\xi,$$

thus it follows that $E(\hat{\beta})=\beta$ and the estimator is unbiased. The estimator variance is:

$$E(\beta - \hat{\beta})^2 = E\left(\beta - \frac{\xi^T C^{-1}\zeta}{\xi^T C^{-1}\xi}\right)^2$$

$$= E\left(\beta - \frac{\xi^T C^{-1}(\beta\xi + \delta)}{\xi^T C^{-1}\xi}\right)^2$$

$$= E\left(\frac{\xi^T C^{-1}\delta}{\xi^T C^{-1}\xi}\right)^2$$

$$= E\left(\frac{\xi^T C^{-1}\delta\delta^T (C^{-1})^T \xi}{(\xi^T C^{-1}\xi)^2}\right)$$

$$= \frac{\xi^T C^{-1} E(\delta\delta^T)(C^{-1})^T \xi}{(\xi^T C^{-1}\xi)^2}$$

$$= \frac{\xi^T C^{-1} C (C^{-1})^T \xi}{(\xi^T C^{-1}\xi)^2}$$

$$= \frac{1}{\xi^T C^{-1}\xi}$$

since $E(\delta\delta^T)=C$ by definition and C is symmetric.

In the examples above, if errors $\epsilon_1$, $\epsilon_2$ and $\epsilon_3$ are independent, then $R=\sigma^2 I$ and $$C = P^T R P$$

$$= \sigma^2 P^T P$$

$$= \sigma^2 \begin{pmatrix} -1 & 0 & 2 \\ 1 & -2 & 0 \\ 0 & 2 & -1 \end{pmatrix} \begin{pmatrix} -1 & 1 & 0 \\ 0 & -2 & 2 \\ 2 & 0 & -1 \end{pmatrix}$$

$$= \sigma^2 \begin{pmatrix} 5 & -1 & -2 \\ -1 & 5 & -4 \\ -2 & -4 & 5 \end{pmatrix}$$

$$C^{-1} = \frac{1}{4\sigma^2} \begin{pmatrix} 9 & 13 & 14 \\ 13 & 21 & 22 \\ 14 & 22 & 24 \end{pmatrix}$$

$$\xi^T C^{-1} = \frac{1}{\sigma^2}(9 \quad 14 \quad 15)$$

$$\xi^T C^{-1}\xi = 38\frac{1}{\sigma^2}$$

Therefore, $$\hat{\beta} = \frac{9\zeta_1 + 14\zeta_2 + 15\zeta_3}{38}$$

and the variance $$E(\hat{\beta} - \beta)^2 = \frac{1}{\xi^T C^{-1}\xi} = \frac{\sigma^2}{38}.$$

It is to be noted that values $\chi_1, \ldots, \chi_M$ and $\zeta_1, \ldots \zeta_N$ are only known modulo $2\pi$, but since $\zeta_j$ represents a phase difference of a virtual interferometer of unit distance, $d_0$, then the value $\zeta_j$ which is taken to lie in the interval $[-\pi, \pi)$, is the correct phase.

If the correct number of $2\pi$'s are known to add onto $\tilde{\chi}_j$ to make $\chi_j$, then it would not be necessary to construct the $\zeta_j$'s. The sole purpose of the $\zeta_j$'s is to get over the problem of the 'lost' $2\pi$'s. If the correct number of $2\pi$'s is known to add to $\tilde{\chi}_j$ to make $\chi_j$, then $\zeta=P^T\chi$ and $\xi=P^T k$.

Hence, $$\hat{\beta} = \frac{\xi^T C^{-1}\zeta}{\xi^T C^{-1}\xi}$$

$$= \frac{k^T P(P^T R P)^{-1} P^T \chi}{k^T P(P^T R P)^{-1} P^T k}$$

and the variance is $$E(\hat{\beta} - \beta)^2 = \frac{1}{\xi^T C^{-1}\xi}$$

$$= \frac{1}{k^T P(P^T R P)^{-1} P^T k}$$

In the case where M=N and P is a square matrix, then $$\hat{\beta} = \frac{k^T R^{-1}\chi}{k^T R^{-1}k} \text{ and } E(\hat{\beta} - \beta)^2 = \frac{1}{k^T R^{-1}k}.$$

Furthermore, if the measurements are independent so that $R=\sigma^2 I$, then $$\hat{\beta} = \frac{k^T \chi}{\|k\|^2} \text{ and } E(\hat{\beta} - \beta)^2 = \frac{\sigma^2}{\|k\|^2}.$$

For example, $$\hat{\beta} = \frac{5\chi_1 + 2\chi_2 + 3\chi_3}{38} \text{ and } E(\hat{\beta} - \beta)^2 = \frac{\sigma^2}{38}.$$

If nullifying deterministic error has to be considered, then P will be forced not to be a square matrix.

$\hat{\beta}$ is always an unbiased estimator, no matter how k and P are chosen. So the problem is to find k and P that minimizes $$E(\hat{\beta} - \beta)^2 = \frac{1}{k^T P(P^T R P)^{-1} P^T k} = \frac{1}{\xi^T C^{-1}\xi}.$$

It may seem, by the expression on the right hand side, that $E(\hat{\beta}-\beta)^2$ does not depend on k, since $\xi=(1, 1, \ldots, 1)^T$ and $C=P^T R P$, but different choices of k allow different choices of P, so $E(\hat{\beta}-\beta)^2$ must be minimized over all possible k and P.

k is chosen such that $hcf(k_1, \ldots k_m) = C$ where C is the largest positive integer to divide $k_i$ for every $i=1, \ldots, M$. In forming a column of P, a vector $p = (p_1, \ldots, p_m)^T$ must be found such that $k^T p = 1$, that is, for M linearly independent vectors $p_1, \ldots, p_m$, $p_1^T k = p_2^T k = \ldots = P_m^T k = 1$. However, it can be shown that this is only valid if and only if $hcf(k_1, \ldots, k_m) = 1$.

As the possible choices of k and P are searched to minimize the variance, $E(\tilde{\beta} - \beta)^2$, it is only necessary to search through $k = (k_1, \ldots, k_M)^T$ with $hcf(k_1, \ldots k_M) = 1$.

In the case where $\Delta$, the deterministic error is zero, it is possible to find M linearly independent vectors $p_1, \ldots, p_M$ such that $p_m^T k = 1$ for all M. This means that P can be made into a square M×M matrix.

Hence $$E(\tilde{\beta} - \beta)^2 = \frac{1}{k^T R^{-1} k}.$$

If $\Delta \neq 0$, it is always possible find M−1 linearly independent vectors and never any more, such that $p_m^T k = 1$ and $p_m^T \xi' = 0$ for all m. The extra condition $p_m^T \xi' = 0$ has reduced the number of linearly independent vectors that can be found by one. Now P is a M×(M−1) matrix and $$E(\tilde{\beta} - \beta)^2 = \frac{1}{\xi^T C^{-1} \xi}, \text{ where } C = P^T RP.$$

If the antennas are to be fixed into a relatively small space, for example taking up no more than about 50 to 100 cm, the search can be limited to those k's with entries less than 100.

While the antenna array 32 of FIG. 3 has been described as being one-dimensional, that is, a plurality of antennas spaced at different distances along the same straight line, the antenna array 32 may also comprise a plurality of antennas spaced at different-distances in the same plane.

Before describing a specific embodiment of such a two-dimensional or planar arrangement, Bragg's law in two dimensions will be discussed with reference to FIG. 7.

Figure 7:
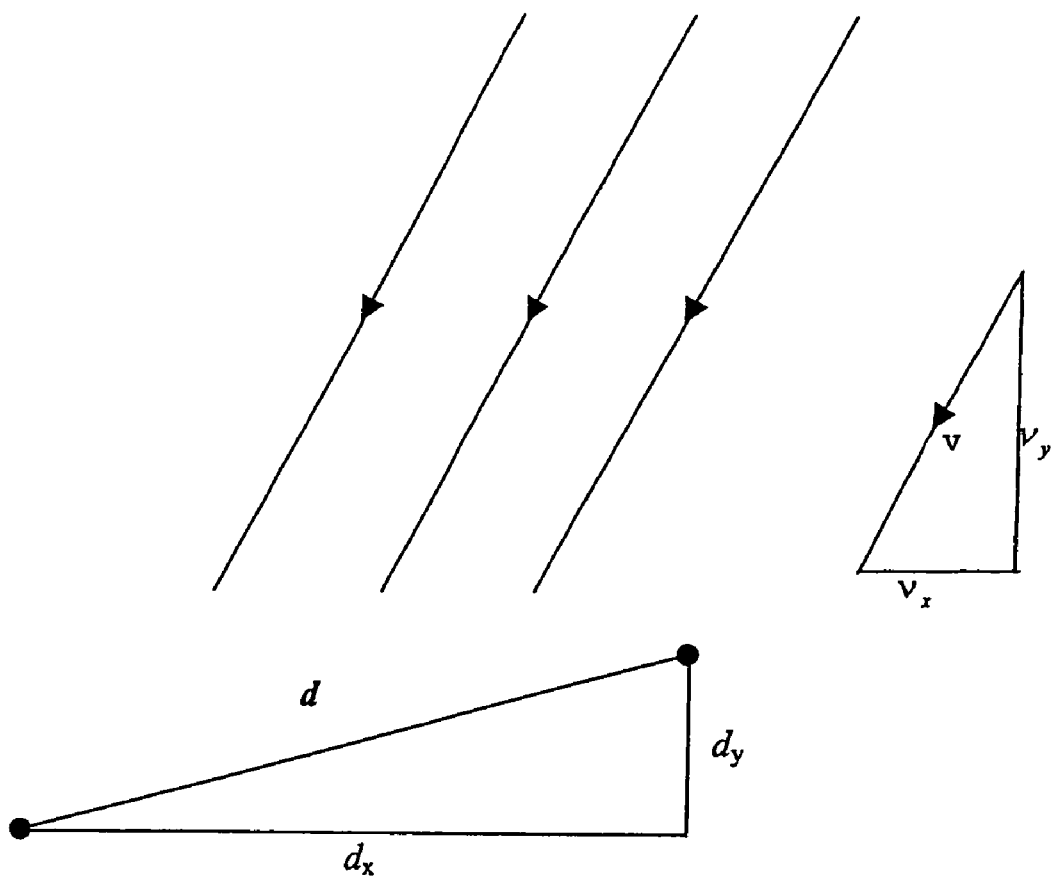
FIG. 7 illustrates Bragg's law for three dimensions where an antenna array is aligned in the x-y plane.

In FIG. 7, a plane wave is shown incident on a pair of antennas lying in the x-y plane which are spaced apart by a distance vector $d = d_x i + d_y j$. The x- and y-component distances are integrals of the same unit spacing $d_0$. The plane wave arrives in a direction described by the unit vector $\hat{v} = (v_x, v_y, v_z)^T$ in three dimensions. The phase difference, in two dimensions, experienced between the two antennas is:

$$\frac{2\pi}{\lambda} d^T \hat{v} = \frac{2\pi}{\lambda} d_x v_x + \frac{2\pi}{\lambda} d_y v_y, \text{ and } \phi_x = \frac{2\pi d_0 v_x}{\lambda}$$

is the theoretical phase difference that would be measured between two antennas separated by the distance vector $d_0 i$ and $$\phi_y = \frac{2\pi d_0 v_y}{\lambda}$$

is the theoretical phase difference corresponding to the distance vector $d_0 j$.

If two antennas are separated by distance vector d, then, $\chi$, the phase difference measured between the two antennas, satisfies $$\chi = \frac{2\pi d^T v}{\lambda} + \varepsilon \text{ where } \varepsilon \sim N(0, \sigma^2).$$

Figure 8:
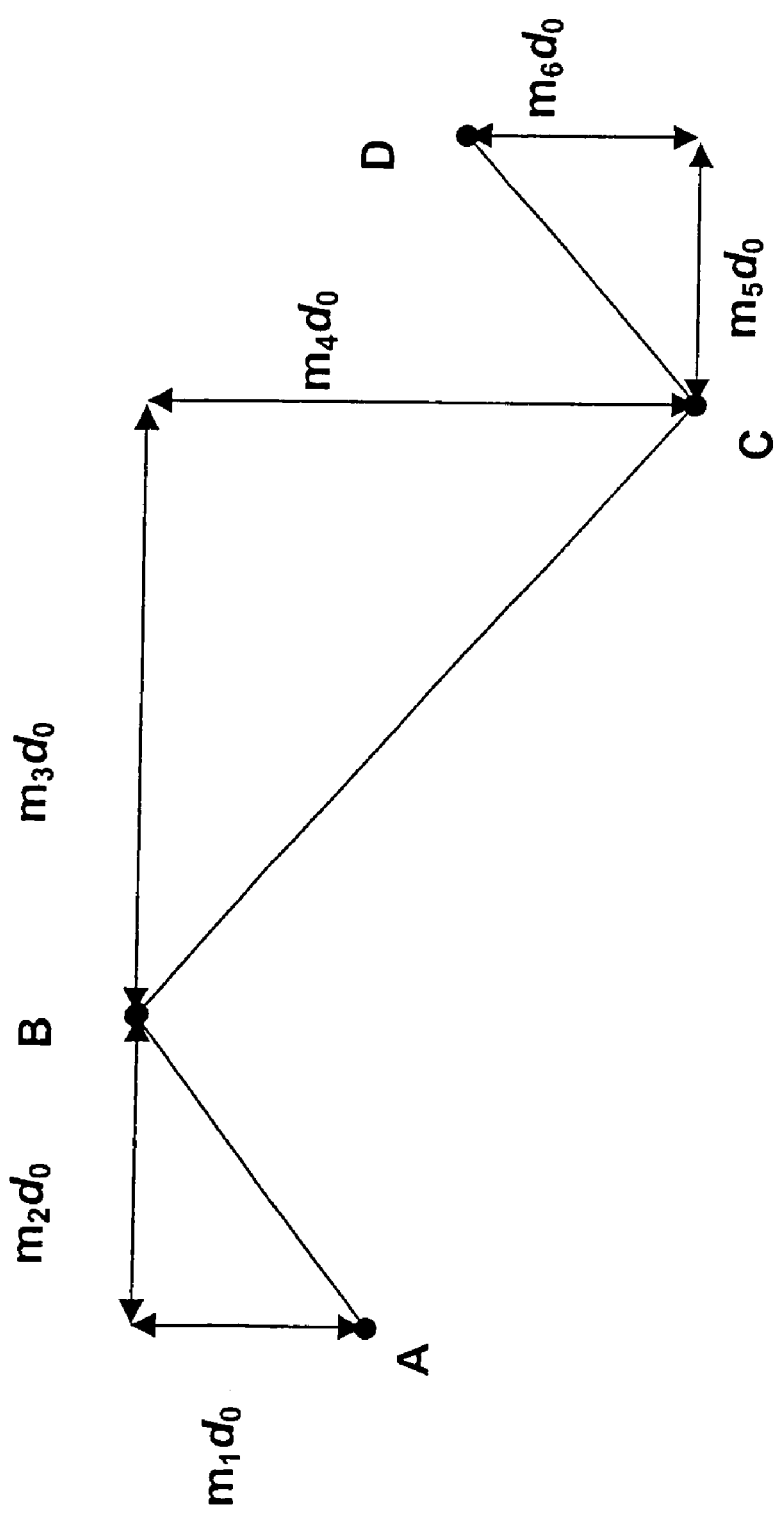
FIG. 8 illustrates a simplified drawing of a second embodiment of an antenna array for use in the apparatus of FIG. 2.

FIG. 8 illustrates a two-dimensional arrangement in which four antennas A, B, C, D are placed in a plane rather than a straight line with separations in the i and j directions which are integer multiples of $d_0$ as shown. In the illustrated example, antenna pair A-B are separated by $m_1 d_0$ in one direction and by $m_2 d_0$ in the other direction. Similarly, antenna pair B-C are separated by $m3 d_0$ and $m_4 d_0$ and antenna pair C-D by $m_5 d_0$ and $m_6 d_0$.

Figure 9:
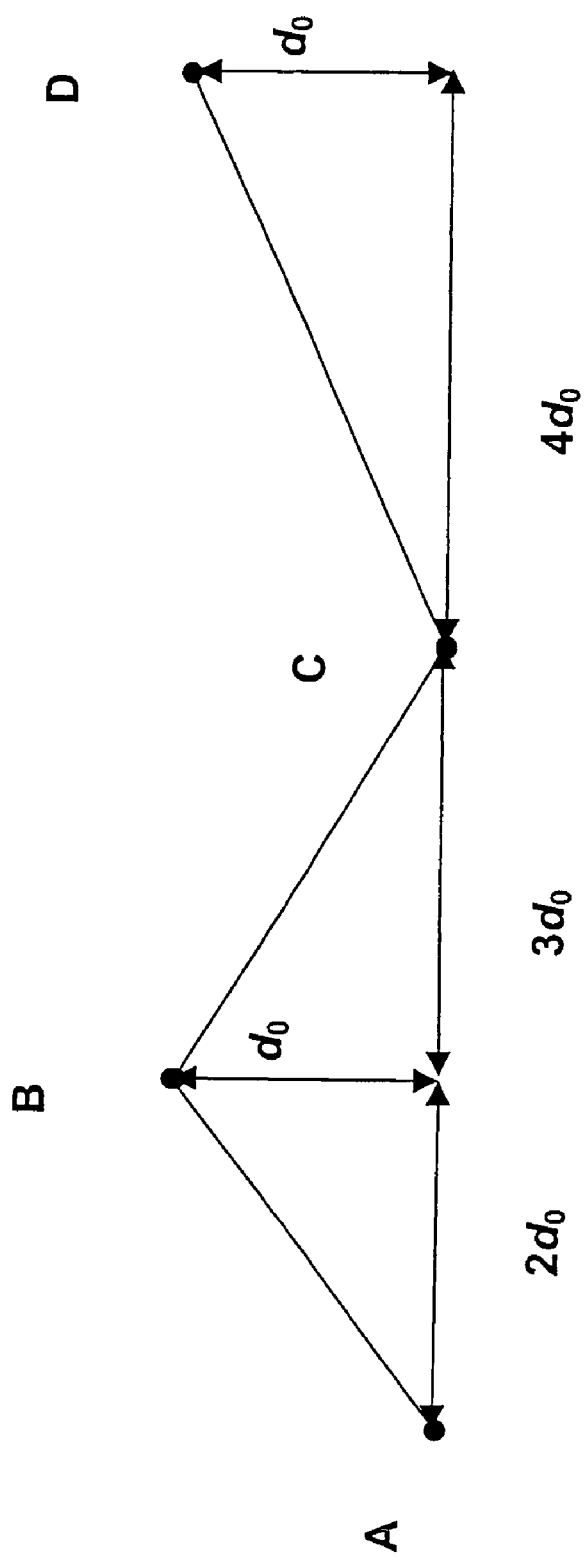
FIG. 9 illustrates a second simplified embodiment of an antenna array in accordance with the present invention.

In order to describe how such a two-dimensional antenna array works, a simplified example is shown in FIG. 9. Again, four antennas A, B, C, D are shown in a plane with A and C being aligned in one direction and B and D being in another direction compared to the alignment direction of A and C. Here, the integral separation is the same in the x and y directions. It may be difficult to obtain different angle and frequency ranges in the x and y directions. If the separation in the x and y direction respectively is $k_{j1}$, $k_{j2}$ between the antennas of the jth pair, then the matrix, K, defining these separations can be expressed as:

$$K = \begin{pmatrix} k_{11} & k_{12} \\ k_{21} & k_{22} \\ k_{31} & k_{32} \\ k_{41} & k_{42} \end{pmatrix}$$

Using the antenna pairs of A-B, C-D, A-D and B-C, K can be populated for the example in FIG. 9 as follows:

$$K = \begin{pmatrix} 2 & 1 \\ 4 & 1 \\ 9 & 1 \\ 3 & -1 \end{pmatrix}.$$

If $\chi_1, \chi_2, \chi_3, \chi_4$ are the measured phase differences between these antenna pairs, then the matrix of these phase differences can be expressed as $\chi = (\chi_1, \chi_2, \chi_3, \chi_4)^T$ and the matrix of the phase measurement error as $\epsilon = (\epsilon_1, \epsilon_2, \epsilon_3, \epsilon_4)^T$. It then follows that:

$$\chi = K \begin{pmatrix} \phi_x \\ \phi_y \end{pmatrix} + \varepsilon$$

which becomes:.

$$\begin{pmatrix} \chi_1 \\ \chi_2 \\ \chi_3 \\ \chi_4 \end{pmatrix} = \begin{pmatrix} 2\phi_x + \phi_y + \varepsilon_1 \\ 4\phi_x + \phi_y + \varepsilon_2 \\ 9\phi_x + \phi_y + \varepsilon_3 \\ 3\phi_x - \phi_y + \varepsilon_4 \end{pmatrix}$$

for the particular example in FIG. 9.

To determine $\phi_x$ and $\phi_y$, two N×4 matrices, $Q_x$ and $Q_y$ need to be determined so that the rows of $Q_x$ and $Q_y$ are linearly independent such that:

$[Q_x K]_{i2} = 0$ for all $i = 1, \ldots, N$ $[Q_y K]_{i1} = 0$ for all $i = 1, \ldots, N$ The reason for the requirement of linearly independent rows is so that no singular covariance matrices are formed. In this case, $$Q_x = \begin{pmatrix} 1 & 0 & 0 & 1 \\ 0 & 1 & 0 & 1 \\ 0 & 0 & 1 & 1 \end{pmatrix}, Q_y = \begin{pmatrix} 2 & -1 & 0 & 0 \\ 0 & 0 & 1 & -3 \\ 0 & 3 & 0 & -4 \end{pmatrix}.$$

Hence, $$Q_x K = \begin{pmatrix} 5 & 0 \\ 7 & 0 \\ 12 & 0 \end{pmatrix}, Q_y K = \begin{pmatrix} 0 & 1 \\ 0 & 4 \\ 0 & 7 \end{pmatrix}.$$

In order to use the same method as for a linear array, the hcf of the x and y column entries (i.e. non-zero) must be 1.

Applying $Q_x$ and $Q_y$ to the phase differences, $\chi$, which have been measured gives:

$$Q_x \chi = Q_x K \begin{pmatrix} \phi_x \\ \phi_y \end{pmatrix} + Q_x \varepsilon$$

$$Q_y \chi = Q_y K \begin{pmatrix} \phi_y \\ \phi_y \end{pmatrix} + Q_y \varepsilon.$$

For example, $$\begin{pmatrix} \chi_1 + \chi_4 \\ \chi_2 + \chi_4 \\ \chi_3 + \chi_4 \end{pmatrix} = \begin{pmatrix} 5\phi_x + \varepsilon_1 + \varepsilon_4 \\ 7\phi_x + \varepsilon_2 + \varepsilon_4 \\ 12\phi_x + \varepsilon_3 + \varepsilon_4 \end{pmatrix} \text{ and }$$

$$\begin{pmatrix} 2\chi_1 - \chi_2 \\ \chi_3 - 3\chi_4 \\ 3\chi_2 - 4\chi_4 \end{pmatrix} = \begin{pmatrix} \phi_y + 2\varepsilon_1 - \varepsilon_2 \\ 4\phi_y + \varepsilon_3 - 3\varepsilon_4 \\ 7\phi_y + 3\varepsilon_2 - 4\varepsilon_4 \end{pmatrix}.$$

Then it is necessary to find $P_x$, $P_y$ which are N×N invertible matrices with integer entries such that $$P_x Q_x K_x = \begin{pmatrix} 1 \\ 1 \\ \ldots \\ 1 \end{pmatrix}$$

of length N and $$P_y Q_y K_y = \begin{pmatrix} 1 \\ 1 \\ \ldots \\ 1 \end{pmatrix}$$

of length N, where $K_x$ and $K_y$ are the columns of K, i.e. $K = (K_x \, K_y)$.

If $\zeta_x = P_x Q_x \chi$, $\zeta_y = P_y Q_y \chi$, $A_x = P_x Q_x$ and $A_y = P_y Q_y$, then $$P_x Q_x \chi = P_x Q_x K \begin{pmatrix} \phi_x \\ \phi_y \end{pmatrix} + P_x Q_x \varepsilon,$$

i.e., $\zeta_x = \phi_x \xi + A_x \varepsilon$ where $\xi = \begin{pmatrix} 1 \\ 1 \\ \ldots \\ 1 \end{pmatrix}$ of length N and $\zeta_y = \phi_y \xi + A_y \epsilon$.

For example, $$P_x = \begin{pmatrix} 3 & -2 & 0 \\ 5 & 0 & -2 \\ -6 & 1 & 2 \end{pmatrix} P_y = \begin{pmatrix} 0 & 2 & -1 \\ 5 & -1 & 0 \\ -6 & 0 & 2 \end{pmatrix}$$

$$A_x = P_x Q_x = \begin{pmatrix} 3 & -2 & 0 & 1 \\ 5 & 0 & -2 & 3 \\ -6 & 1 & 2 & -3 \end{pmatrix}$$

$$A_y = P_y Q_y \begin{pmatrix} 0 & -3 & 2 & -2 \\ 10 & -5 & -1 & 3 \\ -12 & -3 & 0 & -4 \end{pmatrix}$$

$$\begin{pmatrix} \zeta_{x_1} \\ \zeta_{x_2} \\ \zeta_{x_3} \end{pmatrix} = \begin{pmatrix} 3\chi_1 - 2\chi_2 + \chi_4 \\ 5\chi_1 - 2\chi_3 + 3\chi_4 \\ -6\chi_1 + \chi_2 + 2\chi_3 - 3\chi_4 \end{pmatrix}$$

$$= \begin{pmatrix} \phi_x + 3\varepsilon_1 - 2\varepsilon_2 + \varepsilon_4 \\ \phi_x + 5\varepsilon_1 - 2\varepsilon_3 + 3\varepsilon_4 \\ \phi_x - 6\varepsilon_1 + \varepsilon_2 + 2\varepsilon_3 - 3\varepsilon_4 \end{pmatrix}$$

$$\begin{pmatrix} \zeta_{y_1} \\ \zeta_{y_2} \\ \zeta_{y_3} \end{pmatrix} = \begin{pmatrix} -3\chi_2 + 2\chi_3 - 2\chi_4 \\ 10\chi_1 - 5\chi_2 - \chi_3 + 3\chi_4 \\ -12\chi_1 - 3\chi_2 - 4\chi_4 \end{pmatrix}$$

$$= \begin{pmatrix} \phi_y - 3\varepsilon_2 + 2\varepsilon_3 - 2\varepsilon_4 \\ \phi_y + 10\varepsilon_1 - 5\varepsilon_2 - \varepsilon_3 + 3\varepsilon_4 \\ \phi_y - 12\varepsilon_1 - 3\varepsilon_2 - 4\varepsilon_4 \end{pmatrix}.$$

Like the one-dimensional case, it is possible to start out with measurements $\tilde{\chi}_j$ which are a multiple of $2\pi$ out from their true value $\chi_j$. However, in creating linear multiples $\zeta_{x_1}$, $\zeta_{x_2}$, $\zeta_{x_3}$, which are estimating the value $\phi_x$, which lies in the range $[-\pi, \pi)$, it is possible to overcome this problem by recording $\tilde{\zeta}_{x_1}$, $\tilde{\zeta}_{x_2}$, $\tilde{\zeta}_{x_3}$, modulo $2\pi$.

Now it is possible to use the techniques of the one-dimensional case to provide estimates $\hat{\phi}_x$, $\hat{\phi}_y$ for $\phi_x$ and $\phi_y$.

Compare the 1-D equations $\zeta = \beta \xi + P^T \epsilon$ to the 2-D equations:

$$\zeta_x = \phi_x \xi + A_x \epsilon$$

$$\zeta_y = \phi_y \xi + A_y \epsilon$$

Hence, the estimators for the 2-D case are:

$$\hat{\phi}_x = \frac{\xi^T C_x^{-1} \zeta_x}{\xi^T C_x^{-1} \xi}, \quad \hat{\phi}_y = \frac{\xi^T C_y^{-1} \zeta_y}{\xi^T C_y^{-1} \xi},$$

where $C_x = A_x R A_x^T$, $C_y = A_y R A_y^T$ and R is the covariance matrix of the $\epsilon_i$'s.

These estimators have variances $$\frac{1}{\xi^T C_x^{-1} \xi} \text{ and } \frac{1}{\xi^T C_y^{-1} \xi}$$

respectively.

In estimating $\phi_x$ and $\phi_y$, estimates are also obtained for $v_x$ and $v_y$, since $$\phi_x = \frac{2\pi d_0 v_x}{\lambda}, \text{ and } \phi_y = \frac{2\pi d_0 v_y}{\lambda}.$$

So the above estimates provide an estimate for $\hat{v}=(v_x, v_y, \sqrt{1-v_x^2-v_y^2})^T$. If the method is repeated several times to get different estimates for $\hat{v}$, the technique builds up a most likely position for a transmitter of the plane wave of electromagnetic radiation. The technique involves minimizing the squares of the errors in estimating $v_x$ and $v_y$.

It is to be noted that the errors for $\phi_X$ and $\phi_y$ are not independent and that they have a degree of covariance. This covariance can be calculated and allowed for but this is not described in detail here.

While the present invention has been described with reference to one-dimensional and two-dimensional antenna arrays, it Will be appreciated that the invention can also be extended to three-dimensional arrays. The antennas can be arranged in a non-planar array provided the boresight of each antenna is parallel. Here, in order to determine $\phi_x$, $\phi_y$ and $\phi_x$, three matrices $Q_x$, $Q_y$ and $Q_x$ need to be determined so that the three-dimensional array can be resolved into three orthogonal linear arrays having spacing vectors $k_x$, $k_y$ and $k_z$. The respective integer values of the vectors $k_x$, $k_y$ and $k_z$ have the highest common factor of 1.

In the three-dimensional case, it is possible to measure both angle of arrival and frequency of the incident radiation simultaneously.

It will also be appreciated that, while the invention has been described with reference to antenna arrays having three and four antennas, the invention is not limited to such numbers and any suitable number of antennas may be used in the antenna array provided the spacing requirements discussed above are met.

What is claimed is:

1. An interferometer arrangement comprising at least three antennas arranged to receive a plane wave of electromagnetic radiation from a transmitter, each antenna being spaced from one another in at least two orthogonal dimensions of a plane in a physical domain such that the vector spacing $k_i$ between pairs of antennas, where $i = 1, 2, \ldots, m$, is such that by application of two matrices $Q_x$ and $Q_y$ with integer entries, it can be resolved into two orthogonal linear arrays which each have spacing vectors $k_x$ and $k_y$ whose integer entries respectively have the highest common factor of 1.

2. An interferometer arrangement according to claim 1, wherein the unit spacing in each of the two dimensions may be different to provide different angular sensitivity.

3. An interferometer arrangement according to claim 1, wherein the antennas are arranged in three dimensions in a non-planar antenna array, and the vector spacing $k_i$ between pairs of antennas, where $i = 1, 2, \ldots, m$, is such that by application of three matrices $Q_x$, $Q_y$ and $Q_z$ with integer entries, it can be resolved into three orthogonal linear arrays which each have spacing vectors $k_x$, $k_y$ and $k_z$ whose integer entries respectively have the highest common factor of 1.

4. An interferometer arrangement according to claim 3, wherein it is possible to measure both direction of arrival and frequency simultaneously.

5. A method of determining the direction of a transmitter of electromagnetic radiation using an interferometer arrangement according to claim 1, the method comprising the steps of:
   a) receiving radiation from the transmitter;
   b) selecting signals from a number of pairs of antennas in the interferometer arrangement for processing; and
   c) processing the selected signals from the selected pairs of antennas to determine unambiguously the direction of the transmitter.

6. A method according to claim 5, wherein step b) comprises selecting at least three pairs of antennas.

7. A method of determining the physical location of a plurality of antennas to form an interferometer arrangement according to claim 1, wherein the interferometer arrangement comprises an antenna array, the method comprising the steps of:
   a) defining a maximum size for the antenna array comprising the plurality of antennas;
   b) determining the number of antenna pairs to be used for measuring the plane wave of electromagnetic radiation incident on the interferometer arrangement;
   c) determining coordinates of the antennas in a processing domain such that spacings between pairs of antennas in the processing plane have a highest common factor of 1;
   d) deriving a set of candidate antenna pair geometries in the physical domain; and
   e) analysing the candidate set to identify the physical location of the plurality of antennas in the antenna array.

8. A method according ot claim 7, wherein step c) comprises producing a set of physical spacing matrices K where $K = [K_x\ K_y]$ and $K_x$ and $K_y$ are the respective matrices of x- and y -coordinates in the physical domain.

9. A method according to claim 8, wherein step c) comprises determining matrices of $K_x'$ and $K_y'$ of meta x-coordinates and meta y-coordinate spacings respectively.

10. A method according to claim 9, wherein step d) comprises applying respective mapping matrices $Q_x$ and $Q_y$ to the physical spacing matrices $K_x$ and $K_y$ such that $Q_x K_x = K_x'$ and $Q_x K_y = 0$ for the meta x -coordinate spacings, and $Q_y K_y = K_y'$ and $Q_y K_x = 0$ for the meta y -coordinate spacings.

11. A method according to claim 10, further including the steps of:
   (i) deriving a candidate set $(K, Q_x, Q_y)$ of candidate geometries;
   (ii) finding matrices $P_x$ and $P_y$ such that $P_x K_x' = \xi$ and $P_y K_y' = \xi$ where $\xi$ is a column vector of all ones;
   (iii) rejecting entries in the candidate set with no solution; and
   (iv) modifying the candidate set to include $P_x$ and $P_y$.

* * * * *